United States Patent [19]

Mastache

[11] Patent Number: 5,251,484
[45] Date of Patent: Oct. 12, 1993

[54] ROTATIONAL ACCELEROMETER

[75] Inventor: Mark D. Mastache, Boise, Id.

[73] Assignee: Hewlett-Packard Company, Palo Alto, Calif.

[21] Appl. No.: 862,909

[22] Filed: Apr. 3, 1992

[51] Int. Cl.⁵ .......................................... G01P 15/125
[52] U.S. Cl. .................................................. 73/517 A
[58] Field of Search ....................... 73/517 A, 517 R; 324/661, 676

[56] References Cited

U.S. PATENT DOCUMENTS 4,435,737  3/1984  Colton ............................. 73/517 A

FOREIGN PATENT DOCUMENTS 0583397  12/1977  U.S.S.R. ........................... 73/517 A
1035523   8/1983  U.S.S.R. ........................... 73/517 A
1040424   9/1983  U.S.S.R. ........................... 73/517 A

*Primary Examiner*—Hezron E. Williams
*Assistant Examiner*—Michael Brock
*Attorney, Agent, or Firm*—E. F. Oberheim

[57]  ABSTRACT

A rotary accelerometer has capacitively coupled rotary and fixed thin film electrodes fixed to a substrate. The rotary electrode is angularly flexible and has a central hub secured to the substrate and spoke electrodes radially extending from the hub. Elongated electrodes are fixed to the substrate in circumferential positions on each side of each spoke electrode and in the same plane as the spoke electrodes. The rotary electrode, having a mass and being angularly flexible, responds to angular acceleration to differentially change the gaps between its spoke electrodes and the adjacent fixed electrodes. The fixed electrodes are energized with rectangular wave voltages of opposite phase. The sum of these voltages in the spoke electrodes is a function of the difference in the gaps which, in turn, is a function of the angular inertia of the rotary electrode.

11 Claims, 1 Drawing Sheet

ROTATIONAL ACCELEROMETER

FIELD OF THE INVENTION

This invention relates generally to accelerometers and more particularly to accelerometers for sensing rotational or angular acceleration.

BACKGROUND OF THE INVENTION

Accelerometers are useful in many applications. In one application, as in airbag inflation in automobiles, a linear acceleration sensor system provides a signal to initiate inflation of the airbag in response to acceleration above a given threshold in a front or rear collision. In general, acceleration, being the second derivative of displacement, is an advance indicator of an impending change in position or displacement of an object and provides a signal sufficiently in advance of velocity build up and displacement of an object, to provide lead time in taking action to restrain and limit object displacement. In a vehicle, this limits displacement of the occupant in contact with the airbag and distributes the restraining force over a large area of the occupants body.

Another application is in a closed loop control system for moving and positioning an object, in which an acceleration force, due to mechanical shock, for example, has a force component acting in a direction to displace the object from a command position. The accelerometer in the system produces a control signal proportional to the acceleration. This acceleration signal is coupled in the control loop in a sense to apply a force to the object in a direction which, ideally, is opposite to and equal to the force acting on the object due to the mechanical shock, to thereby prevent or minimize displacement of the object from command position.

Accelerometers are advantageously employed in disk drives. Here, closed loop control systems are employed in driving the actuators which move the transducers to different radial positions on a disk in a track seeking mode of operation and, when a target track is found, to utilize the transducer in a closed loop, track following mode of operation to maintain the transducer in a track centered position, for recording or reading purposes.

Linear accelerometers are useful in both linear actuator drives and unbalanced rotary actuator drives for sensing acceleration forces acting along the path of movement of the mass center of the actuator. Signals from the accelerometer, when coupled into the closed loop and properly calibrated, produce forces acting on the actuator which minimize displacement of the transducer from the target track.

Trends in disk drives are to pack higher densities of information recordings into drives of smaller form factor, that is, smaller packages. This reduces available space on the circuit board for accommodating the control system for a drive, indicating the need for an accelerometer compatible with an integrated circuit environment.

Accelerometers for use in airbag inflation control in automobiles include an integrated circuit compatible accelerometer fabricated by surface micromaching techniques. Such an accelerometer is described by Frank Goodenough in an article entitled "Airbags Boom When IC Accelerometer Sees 50 G", Electronic Design, Aug. 8, 1991. This IC accelerometer is micromachined from polysilicon on a monocrystaline-silicon substrate. It is a variable differential capacitor type of linear acceleration sensor having fixed and movable capacitor electrodes or plates, the latter comprising part of a movable, tethered mass which is supported to be displaced relative to the fixed plates in response to linear acceleration.

Such a linear accelerometer has potential for application in disk drives employing linear actuators or rotary actuators that are not mass balanced, but is not suited for application in a disk drive which has a mass balanced rotary actuator which is relatively insensitive to linear acceleration and requires no compensation in that respect.

SUMMARY OF THE INVENTION

This invention provides a rotary accelerometer for sensing rotational or angular acceleration which is particularly useful in a control system for a balanced rotary actuator in a disk drive, in minimizing, if not preventing entirely, unwanted radial displacements of a transducer from a selected track, during disk drive operation.

The rotary accelerometer comprises a capacitively coupled electrode structure for sensing relative angular displacements between fixed and rotatable, or relatively angularly displacable, electrode structures, in the presence of rotational acceleration due to mechanical shock. In the disk drive application, the rotary accelerometer is mounted with respect to the disk drive housing in a position to sense rotational acceleration about the axis of the rotary actuator. Preferably this position is on the circuit board which is located within the housing.

In greater detail, the rotary accelerometer comprises a thin film structure of movable and fixed, capacitively coupled, polysilicon electrodes, supported upon a monocrystaline-silicon (p-type) substrate. The movable electrode, called a rotary electrode, comprises a hub having integral spoke electrodes radially projecting therefrom and supported, at least at its hub center, on the substrate. The fixed electrodes comprise fixed electrode pairs, one being disposed on each side of a spoke electrode in spaced relation therewith.

Oppositely phased time varying voltages, such as rectangular voltages, are coupled to corresponding electrodes of the fixed pairs of electrodes in the same polarity sense. Relative angular displacement between the rotary and fixed electrodes in the presence of rotational acceleration produces a signal voltage in the rotary electrode proportional to the rotational acceleration and of the same phase as the larger of the oppositely phased voltages coupled into the rotary electrode, the latter of which indicates the direction of the rotational acceleration.

BRIEF DESCRIPTION OF THE DRAWINGS

The invention will be better understood by reference to the following specification when considered in conjunction with the accompanying drawings, in which.

DESCRIPTION OF THE PREFERRED EMBODIMENT

Figure 1:
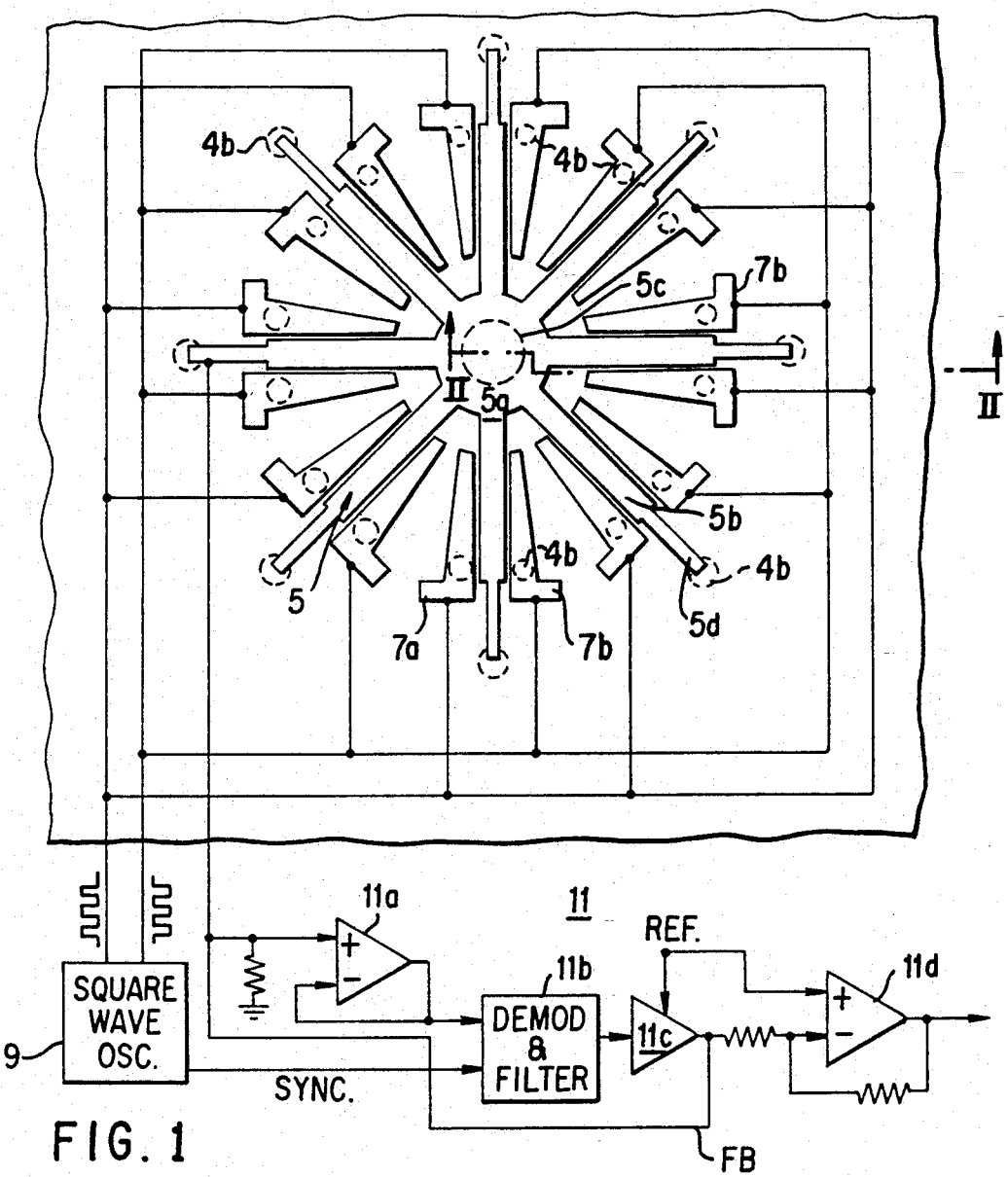
FIG. 1 is a plan view of a rotation accelerometer embodying the principles of this invention.

Referring now to the drawings, FIG. 1 illustrates a rotary accelerometer 1 fabricated on a base or substrate 3. A rotary electrode structure 5 has a hub 5a and radial spoke electrodes 5b. The hub 5a is joined in the region of its center at 5c to the substrate 3. If needed, flexible extensions 5d at the distal ends of the spoke electrodes 5b are joined at their distal ends to the substrate 3. These flexible extensions 5d permit circumferential movement of the distal ends of the spoke elect electrodes 5b. Fixed electrodes 7a and 7b are respectively disposed on the substrate 3 on opposite sides of each spoke electrode 5b, in positions equally spaced from the spoke electrodes. A square wave oscillator 9 produces oppositely phased rectangular wave voltages of equal magnitude, voltages of one phase being coupled to the fixed electrodes 7a and voltages of the opposite phase being coupled to the fixed electrodes 7b. An output circuit 11, the input of which is coupled to the movable electrode structure 5, receives and processes the signal from the rotary electrode 5. The signal from the movable or rotary electrode 5 is buffered into the output circuit 11 by a buffer amplifier 11a. the output of the buffer amplifier 11a is demodulated and also filtered if necessary, by a demodulator 11b which is synchronized with the square wave oscillator 9. The output of the demodulator 11b is amplified in an amplifier circuit which comprises a preamplifier 11c and an output amplifier 11d. An offset voltage REF may be provided if needed to establish a desired signal level at the output of the output amplifier 11d. The output signal at the output amplifier 11d is proportional to the angular acceleration and applicable as a feed forward signal in a disk drive application. A preferred approach is to couple a feed back signal FB back to the rotary electrode. This is a force balance negative feed back loop which creates an electrostatic force between the fixed and movable electrodes. The electrostatic force restores the rotary mass, i.e., tends to hold the rotary mass in neutral position. The voltage required to accomplish this is the useful feed forward or output signal.

Although a balanced rotary actuator is relatively insensitive to linear acceleration it is sensitive to angular or rotational acceleration. The rotary accelerometer disclosed herein embodies the rotary electrode structure 5 which is supported to respond to rotational or angular acceleration. It is preferred that the rotary electrode be only centrally supported since the central support alone provides greater sensitivity to rotational acceleration. Where stability is a problem, however, the flexible supports 5d at the spoke electrode extremities improve stability. A rotary accelerometer is mounted on a body to sense angular acceleration about an axis having a particular orientation. In a balanced rotary actuator type of disk drive, that axis is the axis about which the actuator rotates. Thus, attaching of the rotary accelerometer to the disk drive with its axis coincident with or paralleling the actuator spindle axis is indicated. Where this is not practical, a location should be chosen within the disk drive housing, achieving a close approximation thereto. When mounted with its axis paralleling the actuator spindle axis the rotary accelerometer is subject to the same acceleration forces or torques as the rotary actuator, which is desirable. Any force applied to the disk drive housing which does not act through the mass center of the drive, subjects the drive to rotational acceleration. While this rotational acceleration may not be about an axis paralleling the actuator spindle axis, the rotary accelerometer when positioned as preferred, experiences the same acceleration as the balanced rotary actuator.

Figure 2:
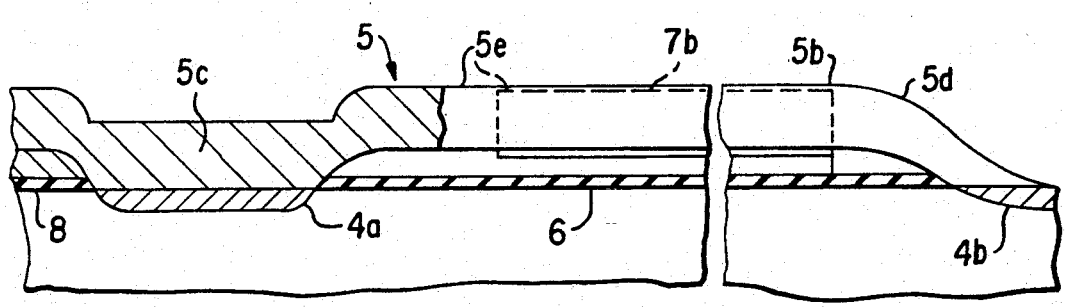
FIG. 2 is a sectional view taken on the section line II—II of FIG. 1.

A rotary accelerometer in accordance with the presently known best mode for practicing this invention, as seen in FIG. 2, comprises the substrate 3 of a material such as monocrystiline-silicon, a p-type silicon, in which n+ regions 4 are formed in predetermined locations. An insulating layer 6 having openings therethrough at the n+ regions overlies the substrate 3. An oxide layer 8 overlies the dielectric layer 6, except at said n+ regions 4. A polysilicon layer 5e overlies the oxide layer 8 and is joined to the substrate 3 at the n+ regions 4. Both the fixed electrodes, 7a, 7b, and the rotatable electrode structure 5 are separated or cut, as by etching, from this layer 5e. Attention is directed to the fixed electrode 7b in FIG. 2. It is shown in a position slightly lower than the rotary electrode spoke 5b. In practice, the fixed electrodes are in the same plane as the spoke electrodes 5b. The fixed electrode is offset here only so that it can be easily seen.

The oxide layer 8 is removed from its position beneath the polysilicon layer 5e. An etching process is employed to remove the oxide. The polysilicon layer 5e is now spaced above the dielectric layer 6 a distance equal to the thickness of the oxide layer 8 and is supported in that position by its attachment to the substrate at the locations where it is joined to the central n+ region 4a and the peripheral n+ regions 4b of the substrate. These peripheral n+ regions 4b are at locations on the substrate radially L spaced from the central n+ region 4a on the substrate, see FIG. 1, in circumferentially spaced positions, to provide support for the radially disposed and circumferentially spaced, fixed, 7a,7b, and movable, 5b, capacitor plates or electrodes which are individually separated or cut from the polysilicon layer 5e. Separation is preferably accomplished by The electrode structures so formed, comprise the fixed electrodes, 7a,7b, and the rotary electrode 5. The rotary electrode 5 comprises the central hub 5a having the radially disposed circumferentially spaced spoke electrodes 5b The hub 5a of this rotary electrode structure 5 is attached and supported at its central hub location 5c to the centrally located n+ region 4a in the substrate 3 and the distal ends of the spoke electrodes 5b are each supported by the integral, flexible spoke electrode extension 5d, joined at substrate.

Being supported in this manner, the rotary electrode 5 has limited angular or rotary freedom to respond to angular or rotary acceleration. This being its primary functional mode, it is therefore referred to as a rotary electrode. This support geometry also permits limited linear displacement of the rotary electrode 5 in response to linear acceleration. Such linear response is canceled in the geometry of the rotary and fixed electrodes, as will be seen.

A fixed electrode, 7a,7b, is supported on each side of each spoke electrode 5b, defining a small airgap therewith. The gaps are equal. Each spoke electrode 5b and the two adjacent fixed electrodes, 7a,7b, are differentially capacitively coupled when the fixed electrodes, 7a,7b, are energized with oppositely phased time varying voltages, such as square wave voltages, seen in FIG. 1. The adjacent fixed and movable electrodes constitute a differential capacitor. Angular movement of the rotary electrode structure 5 displaces the spoke electrodes 5b between the oppositely disposed fixed electrodes, 7a,7b, differentially physically changing the electrode gaps between it and the adjacent fixed electrodes.

In sensing angular acceleration, the rotary electrode functions as a mass responsive to acceleration torques about a central axis, which central axis is defined as an axis passing through the mass center of the rotary electrode, perpendicular to the plane of the rotary electrode structure.

The fixed electrode pairs, 7a,7b, a fixed electrode pair being defined as the pair of fixed electrodes associated with a single spoke electrode 5b of the rotary electrode structure, are differentially energized, preferably using a pair of square wave voltages which which are 180 degrees out of phase with each other and of the same magnitude. Corresponding electrodes in the fixed electrode pairs are energized with voltage of the same phase.

In the absence of acceleration torques, in which case the spoke electrodes 5b are each centered between its fixed electrode pair, 7a,7b, the capacitive couplings across the gap pairs thereat are balanced and the net voltage coupled into each of the spoke electrodes is zero. Angular displacement of the rotary electrode structure 5 with respect to the fixed electrodes, 7a,7b, in response to angular acceleration, produces an unbalance in capacitive coupling of the spoke electrode 5b with the fixed electrode pairs, 7a,7b, which unbalance is proportional to the angular displacement which is proportional to the angular acceleration. The difference in the magnitudes of the square wave voltages coupled into the individual spoke electrodes is therefore proportional to the angular acceleration. Response to linear acceleration is cancelled because corresponding diametrically opposed gaps vary dimensionally in opposite senses so that the net change in voltage in the rotary electrode structure is zero.

In the application of this rotary accelerometer to a disk drive having a balanced rotary actuator, the accelerometer is intended for mounting in the drive, preferably on the circuit board, to sense angular acceleration about an axis paralleling or coincident with the spindle axis of the balanced rotary actuator. The signal derived from the moving or rotary electrode structure is preferably coupled as a feed forward signal in the circuit controlling the actuator motor. The direction in which the actuator is to be driven depends upon the direction of the angular acceleration. That direction is indicated by the phase of the signal developed at the rotary electrode structure, being in phase with the greater of the oppositely phased square wave input signals, depending upon the direction of the angular acceleration.

The specific design of this rotary accelerometer, employing an eight spoke rotary electrode structure 5, is arbitrary and represents the presently known best design configuration. In general, the greater the number of parallel connected capacitors in the array, the greater the acceleration response. The mechanical design is a factor in sensitivity, that is, the useful threshold of response. The cross sectional area of the central attach point 4a of the rotary electrode and the spring rate of the spoke electrode extensions 5d are significant factors in the stiffness of the rotary accelerometer, the higher the stiffness, the higher the threshold of useful response to rotational acceleration.

Disk drives in varying form factors, actuator designs, actuator motors and control systems vary in control requirements for restraining actuator displacement in the presence of angular acceleration during operation. Thus a rotary accelerometer is necessarily tailored mechanically and electrically to the disk drive to which it is applied so that track following errors are held within acceptable limits.

In the application of the rotary accelerometer to a disk drive, for example, a small form factor disk drive of the type useful in lap top applications, regarded as a mechanically abusive environment, the starting point for the rotary accelerometer design for any disk drive application is the required range of acceleration response. A useful sensitivity range for disk drive applications is 0-2000 rad/sec$^2$.

Thus, this disclosure in referencing specific fabrication techniques, design configurations and materials, together with design considerations for particular applications, provides an enabling teaching to those skilled in the art for practicing this invention.

What is claimed is:

1. A rotary accelerometer, comprising:
    a substrate;
    an angularly flexible, rotary electrode comprising a central hub having an axis, and a least one pair of, substantially radially disposed spoke electrodes projecting in opposite directions from said central hub, substantially along a common diameter, each spoke electrode having opposite sides;
    means attaching said central hub to said substrate, and
    an elongated electrode fixedly attached to said substrate, respectively on the same side of said opposite sides of each spoke electrode and defining with each spoke electrode respective circumferential gaps which are substantially equal.

2. The rotary accelerometer according to claim 1, comprising: a flexible connection between the distal end of each spoke electrode and said substrate.

3. The rotary accelerometer according to claim 1, comprising:
    a second elongated electrode fixedly attached to said substrate on the remaining side of said opposite sides of each spoke electrode and defining with each spoke electrode respective second, substantially equal circumferential gaps which are substantially equal to said first circumferential gaps.

4. The rotary accelerometer according to claim 3, in which:
    said angularly flexible rotary electrode is balanced about said axis.

5. The rotary accelerometer according to claim 1, in which:
    said angularly flexible rotary electrode is balanced about said axis.

6. The rotary accelerometer according to claim 1, in which:
    each elongate electrode and said rotary electrode are thin film electrodes.

7. The rotary accelerometer according to claim 6, comprising:
    a flexible thin film connection between the distal end of each spoke electrode and said substrate.

8. The rotary accelerometer according to claim 7, in which:
    said thin film connection is integral with said spoke electrode.

9. The rotary accelerometer according to claim 6, in which:
    said thin film electrodes are disposed in the same plane.

10. The rotary accelerometer according to claim 1, in which:
    said substrate is of a monocrystaline-silicon material and said rotary electrode and each elongated electrode are of a polycrystaline material.

11. The rotary accelerometer according to claim 10, in which:
    said rotary electrode and each elongated electrode are attached to said substrate at n+ regions in said substrate.

* * * * *